Oct. 30, 1956  P. P. M. DUBOSCLARD  2,768,558
VERTICAL MILLING MACHINE
Filed May 10, 1954  2 Sheets-Sheet 1
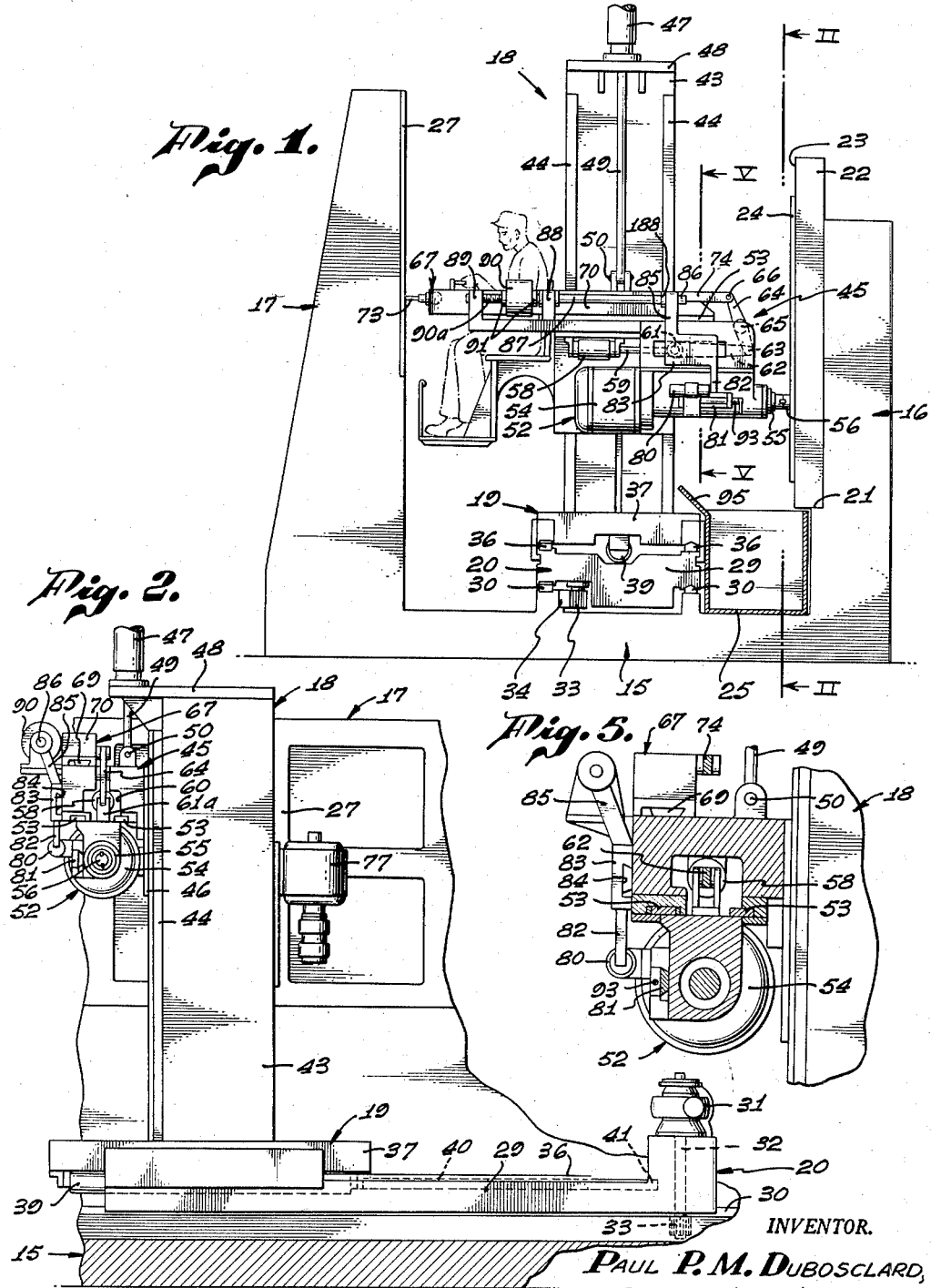
INVENTOR.
Paul P. M. Dubosclard,
By
ATTORNEY.

Oct. 30, 1956  P. P. M. DUBOSCLARD  2,768,558
VERTICAL MILLING MACHINE
Filed May 10, 1954  2 Sheets-Sheet 2
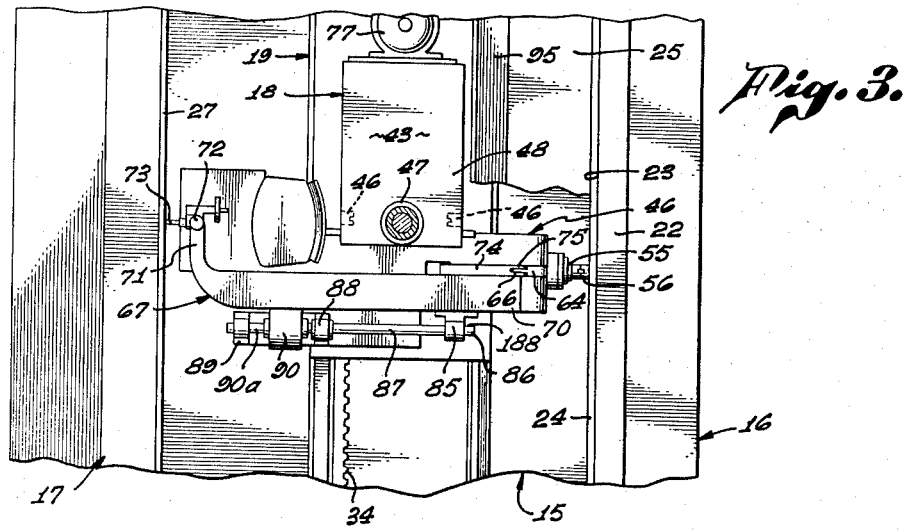
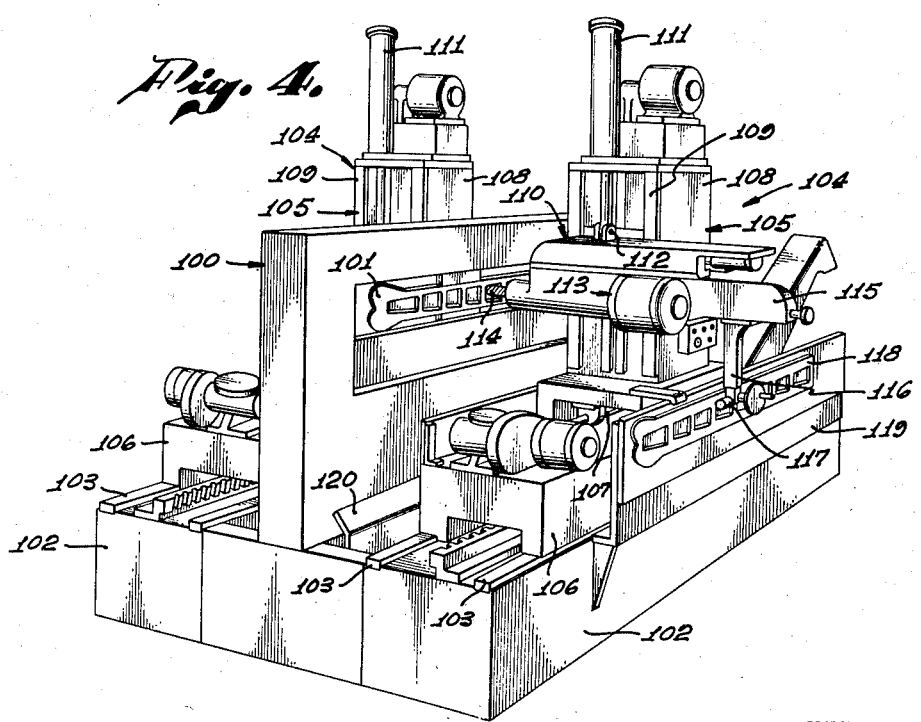
INVENTOR.
PAUL P. M. DUBOSCLARD,
BY
ATTORNEY.

United States Patent Office 2,768,558
Patented Oct. 30, 1956

2,768,558

VERTICAL MILLING MACHINE

Paul P. M. Dubosclard, Topanga, Calif.

Application May 10, 1954, Serial No. 428,592

12 Claims. (Cl. 90—13)

This invention relates to a milling machine and more particularly to a versatile milling machine for milling integral wing skins, wing spars and other air frame constructions of great length and width whereby production time may be reduced to a minimum.

Aircraft design now requires integrally stiffened structures for aircraft instead of built-up structures which consist of numerous parts brought together and held in assembly by various means such as rivets, bolts and the like. The demand for integrally stiffened structures, wherein all of the ribs, stiffeners, lugs to connect other parts and the like are integral with the main structure, has created numerous production problems which have not been solved by prior proposed milling machines.

Prior proposed milling machines have included designs for support of a workpiece on a horizontal work surface. This arrangement is very unsatisfactory for large work such as a wing spar or an integrally stiffened wing skin because the templates for the work must be spaced so far therefrom that tracing operations are difficult, and the chips from the workpiece and the coolant for said chips remain on top of the work whereby inspection of the workpiece being cut is very awkward and inconvenient. Prior proposed milling machines have also included designs with workpiece surfaces arranged vertical and with templates therefor in approximately the same vertical plane. In some instances, the work and the templates are placed longitudinally side by side in the same plate. It is very difficult and practically undesirable to lengthen the machine for longer work in such an arrangement. In those instances where the work and templates are one above the other, it is difficult to increase the height of the machine to accommodate work of greater height. In this latter arrangement other difficulties and disadvantages are present in that if the work is above the templates, chips fall on the templates and produce inaccuracies. If the templates are above the work, the operator is high in the air; and in both cases handling of the work or template is extremely inconvenient and awkward because of the lack of overhead crane clearance for handling the workpiece or the templates therefor.

Prior proposed machines and present equipment associated therewith may require as much as 600 machine hours for milling an integral wing spar of well-known form. It is the purpose of this invention to design and provide a milling machine wherein such a wing spar may be machined in approximately 6 to 9 hours of machine time. This extraordinary savings in machine time is achieved by designing and providing a milling machine which is so arranged that time spent in setting up the machine, the workpiece, the template, inspection of the work, and accommodation of the machine to workpieces of different sizes is cut to a minimum. In other words, a versatile milling machine is contemplated by this invention which is readily adaptable to many varying work conditions and which is substantially automatic in operation.

Generally speaking, this invention contemplates a milling machine for milling large workpieces in the nature of 12 feet wide and 40 feet long or more. The milling machine of this invention contemplates a workpiece support arranged to carry a workpiece with the portion thereof to be milled lying in a vertical plane. Spaced from the work support plane and parallel thereto is arranged a template support means which is adapted to hold a template for said workpiece in juxtaposed relation thereto. Between the template and the workpiece is arranged a machine bed extending parallel to said vertical planes. Mounted on the machine is a carriage means for movement therealong, said carriage carrying a milling cutter for engagement with said workpiece. The milling cutter is so mounted on the carriage that up-and-down and in-and-out movement of the cutter relative to the workpiece is provided. Longitudinal movement of the cutter relative to the workpiece is provided by movement of the carriage on the bed. For accurately controlling longitudinal movement of the cutter and of the carriage, the carriage means includes a subcarriage and a main carriage mounted for limited movement thereon, the subcarriage being slidable on the machine bed for movement along the entire length thereof.

The primary object of this invention therefore is to disclose and provide a milling machine for milling large elongated workpieces wherein the workpiece may be milled to selected configuration in a minimum of time.

An object of this invention is to disclose and provide a milling machine wherein the work support means, the template support means and the milling cutter are arranged in novel manner.

Another object of this invention is to disclose and provide a milling machine wherein the work support means is so arranged that the workpiece need not be moved as machining progresses and wherein ample vertical clearance is provided above the workpiece for handling said workpiece by crane means.

Still another object of this invention is to disclose and provide a milling machine which is adapted to be readily lengthened, widened or increased in height in order to accommodate the machine to new structural designs.

A further object of this invention is to disclose and provide a milling machine having the work support means arranged in such a manner that a maximum number of milling operations can be accomplished without moving the workpiece and wherein the templates for said workpiece may be easily installed or removed as a unit.

This invention contemplates an arrangement of the work support means for such a milling machine wherein the work being milled can be readily inspected while the workpiece is still on the workpiece support. The workpiece is so arranged that an inspector can easily see and dimensionally check the milled work.

A still further object of this invention is to disclose and provide a novel milling machine wherein light metal alloys may be milled at high speed and wherein the accumulation of chips resulting from such high speed milling is controlled and disposed of in a novel and convenient manner.

These and other objects and advantages of this invention will be readily apparent from the following description of the drawings wherein exemplary embodiments of this invention are illustrated.

In the drawings:

Fig. 1 is an end view of a milling machine embodying this invention.

Fig. 2 is a partial side elevational view of the machine shown in Fig. 1, the view being taken from the vertical plane indicated by line II—II of Fig. 1.

Fig. 3 is a fragmentary top plan view of the machine shown in Fig. 1.

Fig. 4 is a perspective view of a different embodiment of this invention.

Fig. 5 is a sectional view taken in the vertical plane indicated by line V—V of Fig. 1.

The embodiment of this invention shown in Fig. 1 generally comprises an elongated machine bed 15, a work support means 16 extending along one side of said bed and parallel thereto and a template support means 17 extending along the opposite side of said bed and parallel thereto. The work support means 16 and the template support means 17 lie in parallel spaced apart vertical planar zones. Between the work support means 16 and the template support means 17 and mounted for movement on the machine bed 15 is a carriage means 18 including a main carriage 19 supported for limited longitudinal movement on a subcarriage 20.

The work support means 16 may be integral with the machine bed 15 as illustrated or may be a separate frame structure lying in parallel relation to the machine bed. The work support means 16 includes an upstanding frame structure, generally illustrated, and may be of any well-known structural form. The frame structure may include an upwardly facing step 21 upon which may be supported suitable vacuum chuck means 22, said chuck means being secured to the work support means 16 in any suitable well-known manner. The vacuum chuck means 22 presents an inwardly facing vertical surface 23 against which may be held a workpiece 24, presenting a surface thereof to be milled in a vertical plane.

The space above the work support means 16 and the workpiece 24 is free from any structure and it is therefore convenient for a crane to handle the workpiece during installation and removal of the workpiece from the work support means. It should also be noted that chips cut from the workpiece may fall into a trough means 25 disposed between the work support means 16 and the machine bed for collection and removal of chips and cutter coolant. The trough means 25 will be described in detail later.

On the opposite side of the machine bed 15 is the template support means 17 which may comprise any suitable upstanding frame structure for supporting selected templates for the workpiece 24. The template support means 17 may be integrally connected with the machine bed 15 as illustrated or may be a separate support means if desired. The template support means 17 is adapted to extend along the machine bed for its entire length or for any part of its length depending upon the work to be milled. A selected template 27 may be carried by the template support means 17 in well-known manner and is juxtaposed with respect to the work 24. Overhead clearance is likewise provided above the template support means to facilitate handling of templates.

The subcarriage 20 may comprise an elongated carriage body 29 movable longitudinally of the machine bed upon parallel longitudinal spaced way means 30. At one end of the sub-carriage body 29 may be mounted a motor means 31 provided with a vertically disposed drive shaft 32 carrying at its lower end a pinion gear 33 for engagement with longitudinally extending rack teeth 34 provided on machine bed 15 between the way means 30. The subcarriage 20 may thus be driven longitudinally of the machine bed for its entire length by the motor means 31.

Means for slidably mounting the main carriage 19 on the subcarriage 20 may comprise a pair of parallel longitudinally extending way means 36 provided on the subcarriage above the way means 30. The main carriage 19 includes a horizontally extending base means 37 for cooperable engagement with the way means 36 and for carrying therebeneath a double-acting fluid cylinder means 39, said cylinder means 39 extending axially of the carriage and within relieved portions provided therefor in the bottom of base means 37 and in the top of subcarriage 20. The cylinder means 39 is provided with a horizontally extending piston rod 40 which may be secured at its free end to the portion of the subcarriage 20 which supports the drive motor 31 as at 41. The cylinder means 39 is controlled by tracing means described later for advancing and retracting the main carriage 19 relative to the workpiece 24.

The base means 37 of the main carriage 19 supports intermediate its ends an upstanding column 43 which normally extends above the work support means 16 and which may be readily extended higher if desired. The upstanding column 43 is rigidly constructed in well-known manner and may provide on one face thereof a pair of vertical spaced apart parallel slide means 44. Movable vertically along the slide means 44 is a saddle means generally indicated at 45, the saddle means being provided with spaced parallel vertically disposed guide members 46 slidably engaging the slide means 44.

Means for moving the saddle means 45 vertically along the slide means 44 may comprise a vertically disposed double-acting cylinder means 47 carried by a top forwardly extending member 48 which overhangs the front face of the column 43. The cylinder means 47 is provided with a downwardly extending piston rod 49 which may be pivotally connected as at 50 in well-known manner to the saddle means 45. The cylinder means 47 is controlled by tracer means as later described.

The saddle means 45 is adapted to support a horizontally disposed milling head means 52 upon horizontally disposed transversely extending ways 53 provided on the saddle means 45 normal to the plane of the workpiece. The milling head 52 may comprise a milling head motor 54 for driving a cutter supporting spindle 55 for rotation about a horizontal transversely disposed axis, said milling head spindle 55 being adapted to mount a milling cutter 56 in well-known manner.

Means for moving the milling cutter 56 in-and-out of the workpiece for cutting to a selected depth (traversing movement) may include a hydraulic double-acting cylinder means 58 carried by the saddle means 45. The cylinder means 58 is disposed with its axis lying above and parallel to the axis of the milling head 52. A piston rod 59 associated with the cylinder means 58 may extend into a transversely arranged opening 60 provided in the saddle means. The free end of the piston head may be pivotally connected as at 61 to the end of a horizontally disposed link 62 and to an upstanding lug 61a on the milling head 52. The outer end of said link 62 is pivotally connected as at 63 to the bottom end of an upwardly inclined lever 64. The lever 64 is pivotally connected between its ends as at 65 to the saddle means 45. The other end of the lever 64 may be pivotally connected at 66 to a transversely movable milling cutter control means 67. The control means 67 moves in a direction opposite to the milling head 52 because of the arrangement of lever 64.

The control means 67 may comprise a rigid horizontal feed back arm 70 having way elements on the bottom face thereof slidably cooperable with horizontal transverse way means 69 on the saddle 45. The feed back arm 70 extends across column 43 and at the end adjacent the template support means is provided with a rearwardly bent end portion 71 which is adapted to carry a two-way hydraulic tracing valve 72. The hydraulic tracing valve 72 includes a tracing stylus or element 73 for tracing contact with template 27. The feedback arm at its other end is provided with a horizontal transversely extending bracket 74 having a yoke 75 receiving the top end of lever 64 for providing the pivotal connection 66 therewith.

The tracing valve means 72 may be of well-known make and manufacture and in this example may comprise a two-way tracing valve for controlling movement of the cutter longitudinally and vertically. The tracing valve is connected by suitable conduits (not shown) to the cylinder means 47 and 39 so that as the carriage means 18 is advanced on the machine bed along the workpiece and the template, response of the tracing stylus 73 to the template will cause the saddle means to be raised or lowered on the slide means 44 and the main carriage 19 to be moved relative to the subcarriage 20. Means for supplying fluid under pressure to the tracing valve means may comprise a pumping unit 77 carried on the rear face of the column 43 and connected to the tracing valve means by any suitable conduit means (not shown).

In this example means for controlling in and out movement (traversing) of the milling cutter with respect to the workpiece may comprise a one-way valve means 80 slidably adjustably mounted on horizontally disposed transverse way means 81 carried by the milling head 52. The valve means 80 is cooperable with a depending portion 82 of an actuating member 83 having an inner face slidably bearing against a front face portion of the saddle means as at 84. The member 83 is provided with a forwardly and upwardly inclined portion 85 having a ported upper end adapted to receive therein a threaded end portion 86 of a rotatable shaft 87. The ported portion 85 may have secured thereto a suitable nut 188 having threaded engagement with the threaded shaft end portion 86. The shaft 87 may be supported forwardly of and parallel to the feed back arm 70 by a pair of spaced upstanding brackets 88 and 89 having suitable bearing means therein for support of the shaft. Between the brackets 88 and 89 may be provided an enlarged drum 90 adjustably fixed to a threaded portion 90a of the shaft lying between said brackets by means of a pair of lock nuts 91. Rotation of drum 90 with respect to calibrated indicia provided adjacent thereto on the control means enables an operator to readily determine the depth of cut being made by the milling cutter with respect to the workpiece. Rotation of drum 90 will cause member 83 to move relative to the tracing valve means 80 and cause actuation thereof so as to actuate cylinder means 58 for moving the milling head in traversing movement.

Means for adjusting the one-way tracing valve means 80 with respect to the member 83 may be provided by an adjusting screw member 93 connected to the valve means 80 for moving the valve means relative to the depending portion 82 of member 83. The screw member 93 thus provides means for zeroing or adjusting the position of valve 80 regardless of the length of a cutter provided on the spindle. The valve means 80 is operatively connected by suitable conduit means (not shown) to the cylinder means 58.

It will be understood that the separate control means for traversing movement of the milling cutter are advantageously employed where the control of depth of the cutter in a workpiece is only occasionally required, as for example in the milling of wing skins. It is understood that in the event the milling cutter requires three dimensional control for a substantial part of workpiece, a three-way tracing valve means may be substituted for the two-way tracing valve 72. Such three dimensional tracing valve means are well known in the art and are not described in detail herein. Such a three-way tracing valve means would be operatively connected to the cylinder means 12, 47 and 58, and the means associated with the one-way valve means 80 would be eliminated.

It will be noted that the workpiece support 16 is spaced from the machine bed 15. A chip-collecting trough 25 is disposed between the workpiece support 16 and the machine bed and may be provided with an inwardly and upwardly deflecting longitudinal portion 95 for covering and protecting the way means 30 and 36 from chips and coolant falling from the workpiece 24. Suitable fluid means may be provided for washing the chips and coolant from trough 25 and for disposing of them at one end of the milling machine. If desirable, the trough 25 may be covered by a suitable open grating providing a cat-walk for an inspector so that access may be readily had to the workpiece. Obviously in this arrangement the workpiece may be conveniently and easily inspected and does not contain chips or cooling liquid which otherwise would make it difficult to accurately measure the work being done.

On some machines it may be desirable to provide a suitable chair or seat for an operator adjacent to template 27. Such a chair is illustrated and is carried by the saddle means so that the operator may easily view the template being cut and accurately and conveniently control the milling cutter.

In operation of the milling machine of this invention the carriage means 18 may be driven at a selected rate of speed along the machine bed by the carriage drive means 31 carried on the subcarriage. This rate of movement may be suitably controlled by the operator by well-known control means (not shown). Relative longitudinal movement between the milling cutter and the workpiece is accurately controlled by tracing valve means 72 connected to the cylinder means 12. Vertical movement of the milling cutter with respect to the workpiece is also controlled by tracing valve means 72 which regulates the action of the vertically disposed cylinder means 15. In-and-out movement of the milling head cutter is controlled by the valve means 80 which is regulated by the operator through rotation of the drum 84 on the threaded shaft 83.

In Fig. 4 is illustrated a different embodiment of this invention which employs the same novel arrangement of a carriage means, a template support means and a work-support means for providing a versatile milling machine capable of milling workpieces of great length and height.

In Fig. 4 a work support means generally indicated at 100 may be constructed in such a manner that a workpiece 101 may be supported thereby for simultaneously conducting milling operations on opposite sides of the workpiece. Such a workpiece may be, for example, a wing spar.

On each side of the work support means 100 is provided a longitudinally extending machine bed 102 having way means 103 thereon for slidably mounting a machine carriage means generally indicated at 104. Each carriage means 104 is generally constructed similarly to that of the prior embodiment in that it includes a main carriage 105 slidably mounted upon a subcarriage 106 which slidably engages the way means 103. The main carriage 105 is movable relative to the subcarriage by a hydraulic double-acting cylinder means 107 in a manner similar to that of the prior embodiment.

Each main carriage 105 includes an upstanding column 108 provided with vertically arranged parallel slide means 109 upon which is slidably mounted a saddle means 110. Vertical movement of the saddle means 110 is provided by a vertically disposed hydraulic cylinder means 111 carried at the top of the column 108 and having a piston rod depending therefrom and connected to the saddle means as at 112.

Each saddle means 110 slidably supports for traversing movement a milling head 113 having a milling cutter 114 positioned for engagement with the workpiece 101. Means for controlling traversing movement of the milling head 113 may comprise tracing valve means as described in the prior embodiment.

Each saddle means 110 carries a control means 115 slidably mounted on the saddle means and provided with a depending arm 116 which may support a tracing valve means 117. The tracing valve means 117 is positioned to engage a template 118 supported in any suitable manner upon a template support means 119 carried by the outboard wall of the machine bed 102 parallel to the work support means 100.

Between the work support means 100 and each machine bed 102 may be provided a suitable elongated trough means 120 for collecting chips and coolant falling from the workpiece 101. A suitable cat-walk may be provided over the trough means 120 so that an inspector may have ready access to the workpiece 101.

It will thus be readily apparent that in this embodiment, the work support means 100 and each template support means 119 are positioned in parallel spaced apart vertical planes and between said planes is longitudinally movable a carriage means for supporting a cutter for engagement with the workpiece. It will thus be readily apparent that in this embodiment of the invention a workpiece may be milled on opposite sides thereof simultaneously. The templates may be readily handled as a unit because adequate overhead clearance is provided for a crane and the workpiece may likewise be readily positioned or removed because of the ample overhead clearance provided between the carriage means of the milling machine.

Thus in both embodiments exemplarily described a versatile milling machine is provided which is capable of handling workpieces of different length, different height and different dimensions. Extension of the machine longitudinally is readily accomplished, and the vertical movement of the saddle means may be readily increased by extending upwardly the upstanding column provided on the main carriage.

It will be understood by those skilled in the art that the arrangement of fixed parallel spaced vertically disposed work support means and template support means in co-operation with a carriage means movable longitudinally between the support means provides a milling machine having many advantages such as ease in handling a workpiece and template, ease of inspection, ready adjustability to size, and the facility of disposing of work chips and coolant. Such a versatile machine materially reduces machine time.

It is understood that various modifications and changes may be made within the spirit of this invention and all such changes coming within the scope of the appended claims are embraced thereby.

I claim:

1. In a milling machine, the combination of: an elongated machine bed provided with ways; a carriage means longitudinally movable along said bed ways and including a subcarriage movable along said bed ways and provided with longitudinal subcarriage ways, and a main carriage supported on and longitudinally movable along said subcarriage ways; means carried by the subcarriage for driving said subcarriage along said bed ways and cylinder means connected between said main carriage and subcarriage for movement of the main carriage along the subcarriage ways; a saddle means vertically slidable on the main carriage; a horizontally disposed milling head means slidably carried by the saddle means and adapted to carry a milling cutter; a work support means spaced from the machine bed for mounting a workpiece in a vertical plane for milling by said cutter; a template support means spaced from the machine bed for carrying a selected template in a vertical plane; a tracing means carried by the saddle means for contact with the template and for controlling movement of said cutter; and means extending between the machine bed ways and work supporting means for collecting and disposing of chips and coolant whereby relatively movable parts of said milling machine are maintained free from chips and coolant.

2. In a milling machine, the combination of: an elongated machine bed provided with ways; a carriage means longitudinally movable along said bed ways and including a subcarriage movable along said bed ways and provided with subcarriage ways, and a main carriage supported on and longitudinally movable along said subcarriage ways; means carried by the subcarriage for driving said subcarriage along said bed ways and cylinder means connected between said main carriage and subcarriage for movement of the main carriage along the subcarriage ways; a saddle means vertically slidable on the main carriage; a horizontally disposed milling head means slidably carried by the saddle means and adapted to carry a milling cutter; a stationary work support means spaced from the machine bed on one side of the carriage means for mounting a workpiece in a vertical plane for milling by said cutter; a stationary template support means spaced from the machine bed for carrying a selected template in a vertical plane on the opposite side of the carriage means; and a tracing means carried by the saddle means for contact with the template and for controlling movement of said cutter.

3. In a milling machine, the combination of: an elongated machine bed provided with ways; a carriage means longitudinally movable along said bed ways and including a subcarriage movable along said bed ways and provided with subcarriage ways, and a main carriage supported on and longitudinally movable along said subcarriage ways; a saddle means vertically slidable on the main carriage; a horizontally disposed milling head means slidably carried by the saddle means and adapted to carry a milling cutter; a stationary work support means spaced from the machine bed for mounting a workpiece in a vertical plane for milling by said cutter; a stationary template support means spaced from the machine bed for carrying a selected template in a vertical plane spaced from the vertical plane of the work support means; and a tracing means carried by the saddle means for contact with the template and for controlling movement of said cutter.

4. In a milling machine, the combination of: a longitudinally extending fixed work support means adapted to support a workpiece with the surface thereof to be milled lying in a vertical plane; a machine bed lying parallel to and alongside said work support means; a stationary template support means positioned at the side of the bed opposite to said work support means and adapted to position a template with the template pattern lying in a vertical plane; carriage means movable on said machine bed between and along said work support means and said template support means; and means mounted on the carriage for moving a cutter relative to the work support means in a vertical direction and in a direction normal to the plane of the work support means.

5. In a high speed milling machine: an elongated bed; a fixed work support means and a fixed template support means arranged in spaced parallel vertical planes on opposite sides of said bed; a carriage means movable along said bed, between and parallel to said planes; means mounting a cutter on said carriage means for movement relative to the work support means; and tracing means mounted on said carriage means for movement relative to the template support means and in cooperable connection to the cutter mounting means.

6. A milling machine as defined in claim 5 wherein said carriage means includes a main carriage and a subcarriage supporting the main carriage and movable relative to said bed and to each other.

7. In a milling machine for milling opposite sides of a workpiece simultaneously, the combination of: a stationary work support means adapted to mount a workpiece in a vertical plane and with opposite faces of said workpiece exposed; machine beds on opposite sides of said work support means; a carriage means independently and longitudinally movable along each of said beds and each including a vertically slidable saddle means; a horizontally disposed milling head slidably carried in each saddle means and adapted to carry a milling cutter for cutting engagement with said workpiece; said cutters being simultaneously operable; stationary template support means positioned outwardly from said carriage means and disposed alongside each machine bed; and tracing means carried by each saddle means and cooperable with the adjacent template support means for controlling an associated cutter.

8. In a milling machine for milling opposite sides of a workpiece simultaneously, the combination of: a fixed work support means adapted to mount a workpiece in a vertical plane and with opposite faces of said workpiece exposed; machine beds on opposite sides of said work support means in parallel relation thereto; a carriage means longitudinally movable along each of said beds and including a vertically slidable saddle means; each carriage means being independently movable; a horizontally disposed milling head slidably carried by each saddle means and adapted to carry a milling cutter for cutting engagement with said workpiece; said cutters being simultaneously operable; stationary template support means positioned alongside each machine bed; and tracing means carried by each saddle means and cooperable with the adjacent template support means.

9. In a milling machine, the combination of: parallel longitudinal machine beds in spaced relation; a stationary work support means between said beds and in spaced relation thereto; stationary template support means parallel to and outwardly of each bed; and carriage means independently movable along each bed to mount a cutter for movement adjacent the work support means and to mount a tracing means for movement along the template means adjacent thereto; said carriage means and cutters mounted thereon being simultaneously operable.

10. In a milling machine, the combination of: a longitudinally extending fixed work support means adapted to support a workpiece with the surface thereof to be milled lying in a vertical plane; a machine bed lying parallel to and alongside said work support means; a stationary template support means positioned at the side of the bed opposite to said work support means and adapted to positioned a template with the template pattern lying in a vertical plane; carriage means movable on said machine bed between and along said work support means and said template support means; means mounted on the carriage for moving a cutter relative to the work support means in a vertical direction and in a direction normal to the plane of the work support means; and means for collecting chips and cooling fluids extending laterally between the work support means and the machine bed.

11. In a high speed milling machine: an elongated bed; a fixed work support means and a fixed template support means arranged in spaced parallel vertical planes on opposite sides of said bed; a carriage means movable along said bed between and parallel to said planes; means mounting a cutter on said carriage means for movement relative to the work support means; tracing means mounted on said carriage means for movement relative to the template support means and cooperably connected to the cutter mounting means; and means extending between the work support means and the elongated bed for collecting chips and cooling fluid.

12. In a high speed milling machine, the combination of: parallel longitudinal machine beds in spaced relation; a stationary elongated work support means between said beds and in spaced relation thereto; elongated means extending between said work support means and each of said beds for collecting chips; template support means parallel to and outwardly of each bed; and one independently movable carriage means on said beds, each to mount a cutter for movement relative to the work support means and to mount a tracing means for movement along the template means adjacent thereto, each of said carriage means and cutters mounted thereon being independently and simultaneously operable.

References Cited in the file of this patent

UNITED STATES PATENTS

| | | |
|---|---|---|
| 1,466,811 | Thacher | Sept. 4, 1923 |
| 1,874,810 | Saives | Aug. 30, 1932 |
| 1,999,787 | Sassen | Apr. 30, 1935 |
| 2,059,505 | Wright | Nov. 3, 1936 |
| 2,405,550 | Bishop et al. | Aug. 13, 1946 |

FOREIGN PATENTS

| | | |
|---|---|---|
| 611,895 | Germany | Apr. 11, 1935 |
| 883,863 | Germany | July 30, 1953 |